(12) United States Patent
Partee

(10) Patent No.: US 10,271,047 B2
(45) Date of Patent: Apr. 23, 2019

(54) TEST FIXTURE FOR TESTING SET-TOP BOXES

(75) Inventor: Jimmie Paul Partee, Double Oak, TX (US)

(73) Assignee: FEDEX SUPPLY CHAIN LOGISTICS & ELECTRONICS, INC., Fort Worth, TX (US)

( * ) Notice: Subject to any disclaimer, the term of this patent is extended or adjusted under 35 U.S.C. 154(b) by 842 days.

(21) Appl. No.: 13/277,087

(22) Filed: Oct. 19, 2011

(65) Prior Publication Data

US 2013/0103341 A1    Apr. 25, 2013

(51) Int. Cl.
*H04N 17/04* (2006.01)
(52) U.S. Cl.
CPC .................. *H04N 17/04* (2013.01)
(58) Field of Classification Search
CPC ........................................ H04N 17/04
USPC .................. 702/108, 118; 725/139
See application file for complete search history.

(56) References Cited

U.S. PATENT DOCUMENTS

| 5,297,009 A * | 3/1994 | Gelez ............... H05K 7/1411 211/41.17 |
| 2002/0091966 A1 | 7/2002 | Barton et al. |
| 2002/0126207 A1 | 9/2002 | Brodigan |
| 2003/0197732 A1 * | 10/2003 | Gupta ............................ 345/764 |
| 2004/0148118 A1 | 7/2004 | Will et al. |
| 2008/0004830 A1 | 1/2008 | Montreuil et al. |
| 2008/0144293 A1 * | 6/2008 | Aksamit ............. H05K 7/1489 361/727 |
| 2009/0064251 A1 | 3/2009 | Savoor et al. |
| 2009/0089854 A1 | 4/2009 | Le et al. |
| 2009/0222359 A1 | 9/2009 | Henry |
| 2010/0017824 A1 * | 1/2010 | Malik ............................ 725/46 |
| 2013/0063606 A1 * | 3/2013 | McClay ............... H04N 17/004 348/181 |

OTHER PUBLICATIONS

International Search Report and Written Opinion dated Jan. 10, 2013; PCT International Application No. PCT/US12/61054.

* cited by examiner

*Primary Examiner* — Eman A Alkafawi
(74) *Attorney, Agent, or Firm* — McGuire Woods LLP

(57) ABSTRACT

A test fixture for testing set-top boxes. The test fixture includes a controller operable to control parallel testing of set-top boxes. The test fixture further includes computing devices in communication with the controller operable to perform testing of each of the set-top boxes in response to commands from the controller. The test fixture further includes testing platforms in communication with the computing devices operable to receive each of the set-top boxes for testing. Each of the testing platforms includes an adapter module for electrically interfacing each of the set-top boxes with the test fixture. The test fixture further includes a user interface in communication with the controller for displaying the test results and receiving input from a user.

19 Claims, 13 Drawing Sheets

100

100

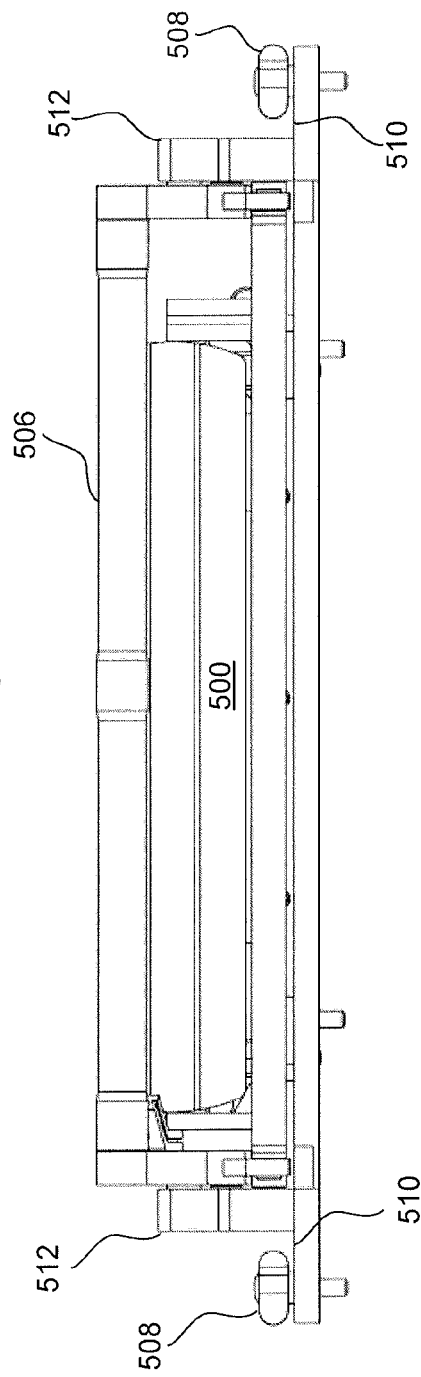
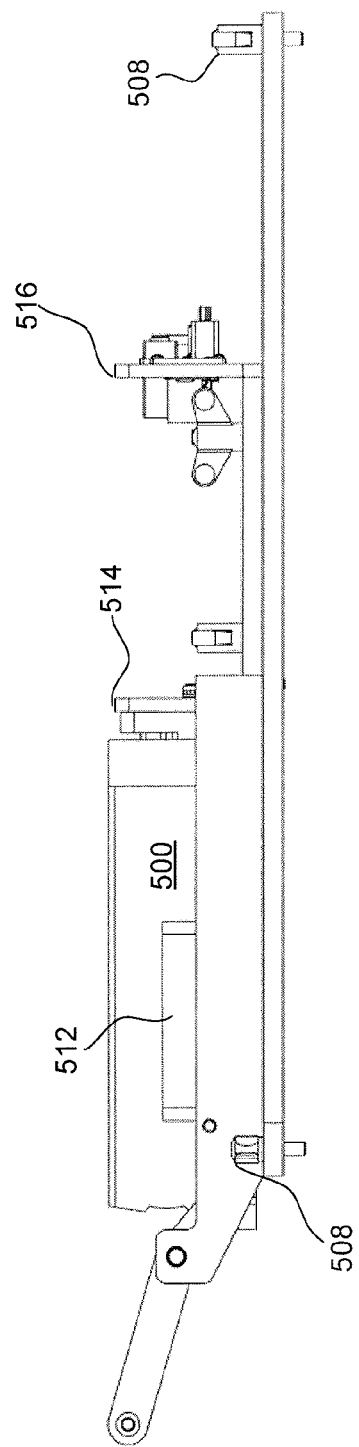

TEST FIXTURE FOR TESTING SET-TOP BOXES

CROSS-REFERENCE TO RELATED APPLICATIONS

This patent application is a co-pending application of U.S. patent application Ser. No. 12/940,331, filed Nov. 5, 2010 entitled "SYSTEM AND METHOD FOR REMOVING CUSTOMER PERSONAL INFORMATION FROM AN ELECTRONIC DEVICE", U.S. patent application Ser. No. 12/940,346, filed Nov. 5, 2010 "SYSTEM AND METHOD FOR AUDITING REMOVAL OF CUSTOMER PERSONAL INFORMATION ON ELECTRONIC DEVICES", and U.S. patent application Ser. No. 12/940,299, filed Nov. 5, 2010, entitled "SYSTEM AND METHOD FOR TRACKING CUSTOMER PERSONAL INFORMATION IN A WAREHOUSE MANAGEMENT SYSTEM" which were previously filed and the teachings and disclosures of which are hereby incorporated in their entireties by reference thereto.

BACKGROUND

The consumption of and development of media communications has grown nearly exponentially in recent years. The growth is fueled by larger networks with more reliable protocols and better communications hardware available to both service providers and consumers. In particular, new set-top boxes, gaming devices, televisions, and network devices are constantly being released.

Set-top boxes are required to go through various forms of testing to ensure compliance with communications and formatting standards, and technical requirements set by standard setting organizations (SSOs), governments, industry groups, companies, service providers, or other applicable parties. Performing tests, evaluation and analysis for a single set-top box may be time consuming and difficult and is complicated when performing tests for multiple set-top boxes.

SUMMARY

A test fixture for testing set-top boxes. The test fixture may include a controller operable to control parallel testing of set-top boxes. The test fixture may further include computing devices in communication with the controller operable to perform testing of each of the set-top boxes in response to commands from the controller. The test fixture may further include testing platforms in communication with the computing devices operable to receive each of the set-top boxes for testing. Each of the testing platforms may include an adapter module for electrically interfacing each of the set-top boxes with the test fixture. The test fixture may further include a user interface in communication with the controller for displaying the test results and receiving input from a user.

BRIEF DESCRIPTION OF THE DRAWINGS

Illustrative embodiments of the present invention are described in detail below with reference to the attached drawing figures, which are incorporated by reference herein and wherein:

FIG. 7 is a pictorial representation of a front-view of a set-top box in a nested platform in accordance with an illustrative embodiment;

FIG. 8 is a pictorial representation of a side-view of a set-top box in a nested platform in accordance with an illustrative embodiment;

FIG. 9 is a pictorial representation of graphical user interface in accordance with an illustrative embodiment;

DETAILED DESCRIPTION OF THE DRAWINGS

Figure 1:
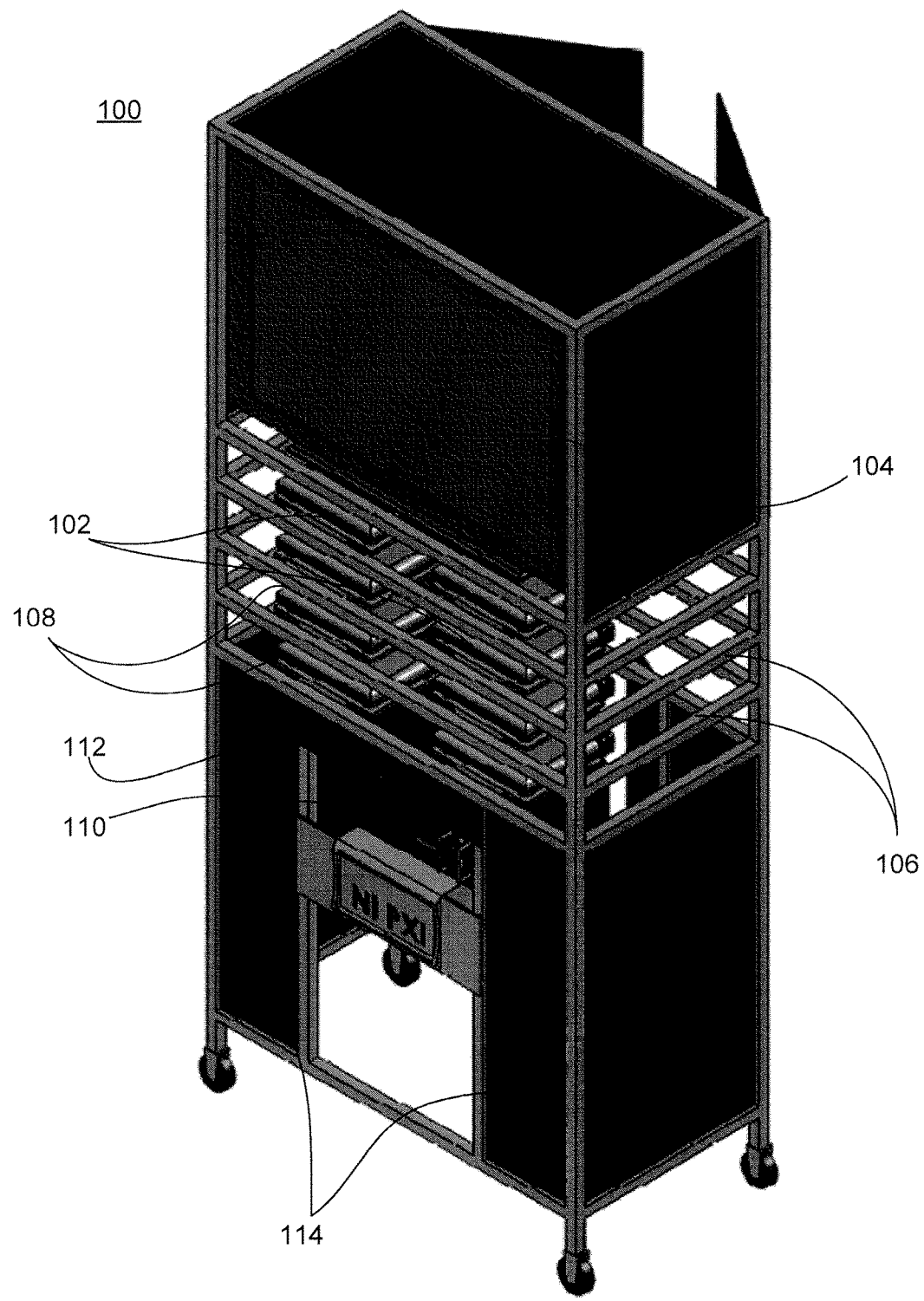
FIG. 1 is a pictorial representation of a test fixture in accordance with an illustrative embodiment.

Illustrative embodiments provide a test fixture and a system and method for testing set-top boxes. The set-top box is any device or apparatus configured for media communications or formatting content for display. Set-top boxes may include media, computing, networks or communications devices including gaming consoles, digital video recorders (DVRs), personal video recorders, cable boxes, and Internet Protocol television (IPTV) devices. The set-top boxes may or may not be stand-alone devices or network/Internet capable devices.

In one embodiment, a test fixture is a testing station that may be utilized to secure the set-top box while testing and measuring the characteristics and performance of the set-top box for performing the required features, processing, and formatting required of the set-top box. The test fixture may be enabled to receive multiple set-top boxes in nested platforms. For example, the test fixture may include eight nested platforms for receiving set-top boxes. In one embodiment, the test fixture may include one or more adapter modules and interfaces for powering and communicating with the set-top boxes.

The test fixture may also include a user interface for a operator, test engineer, or other individual to interface with the test fixture. For example, the user interface may include peripherals, such as a monitor, keyboard, mouse and scanner.

The test fixture may automatically perform pre-established tests, processes, and software updates for testing the set-top boxes and ensuring that all customer private information (CPI) has been removed. The test fixture may also be utilized for performing testing for set-top boxes that operate wirelessly or include wireless functionality. The test fixture may include computing and communications components, including, but not limited to processors, logic, memories, communication ports and interfaces and databases for storing programs, applications, and instructions utilized to perform the automated testing. In another embodiment, a user may utilize the user interface to perform manual testing as needed.

The testing results may be displayed to the test fixture or displayed or communicated to one or more external devices. In one embodiment, a display is partitioned to display results for each of the set-top boxes for purposes of efficiency. The illustrative embodiments may be utilized for returned, refurbished, repaired, or new set-top boxes to efficiently perform tests and analysis. Automated testing removes operator subjectivity, improves quality control, and makes testing faster and less expensive.

The set-top boxes may be configured to perform communications utilizing any number of wired and wireless communications standards, protocols, or formats along with associated hardware, software, and firmware including coaxial cable, twisted pair, digital subscriber line (DSL), fiberoptics, T-1, WiMAX, WiFi, wideband code division multiple access (W-CDMA), CDMA, global system for mobile communications (GSM), general packet radio service (GPRS), enhanced GPRS (EGPRS), high-speed downlink packet access (HSDPA), evolution-data optimized (EVDO), Bluetooth, GPS, WiMAX, personal communications service, and other developing forms of digital and analog communications. The test fixture may also be utilized to perform radio frequency (RF) testing if the set-top box is enabled for wireless communications including testing a remote control associated with the set-top box.

In particular, the test fixture may allow different model types of set-top boxes to be repeatably tested. For example, the test fixture may be configured to test multiple set-top boxes for any model of a particular manufacturer. After the test fixture is initially configured, multiple set-top boxes of that manufacturer having the same or different models, may be tested utilizing the test fixture. The test fixture may indicate the positioning of the respective components utilized during testing to reconfigure the test fixture at a later time. The test fixture may allow a user to quickly insert the set-top boxes into the nested platform. As a result, multiple tests for set-top boxes may be carried out efficiently and consistently and with a high degree of accuracy for set-top boxes reducing costs, time, and difficulty.

The test fixture may be utilized by governmental entities, SSOs, companies, research and development groups, industry regulators, and others that build, test, repair, or refurbish set-top boxes. The test fixture may be configured without any special tools or expensive training. For example, set screws may be utilized to position and secure the components of the test fixture. The test fixture provides a universal test stand, platform, or fixture that may be shared or utilized for numerous set-top boxes, reducing the testing equipment and lab costs that may be required to test each set-top box.

The test fixture may allow testing for a set-top box to be repeated by multiple parties (original equipment manufacturers (OEMs), service providers, government entities). In particular, being able to consistently reproduce media testing may be important when important findings, such as compliance failures or communications failures are measured or tested. The media testing may include formatting and communications to and from the set-top box.

The test fixture allows for the automation of automated tests of internal and external components (i.e. memories, ports, interfaces, etc) as well as video and audio tests. In one embodiment, the tests may be run in parallel to reduce the time required for each of the tests. The software and testing routines may be updated as required for performing the testing. The test results may be saved and post-test parametric and trend analysis may be performed and reported to any number of services providers, manufacturers, or other interested parties.

Figure 2:
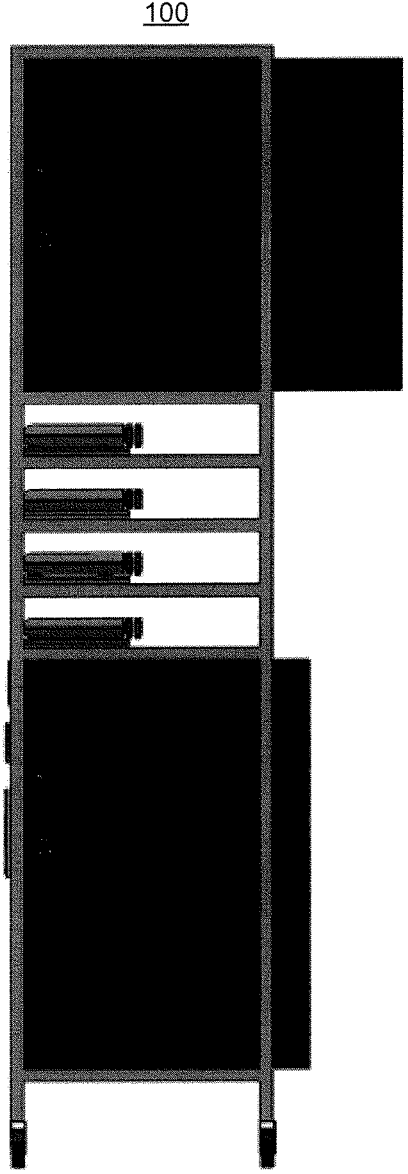
FIG. 2 is a pictorial representation of a side view of the test fixture of FIG. 1 in accordance with an illustrative embodiment.
Figure 3:
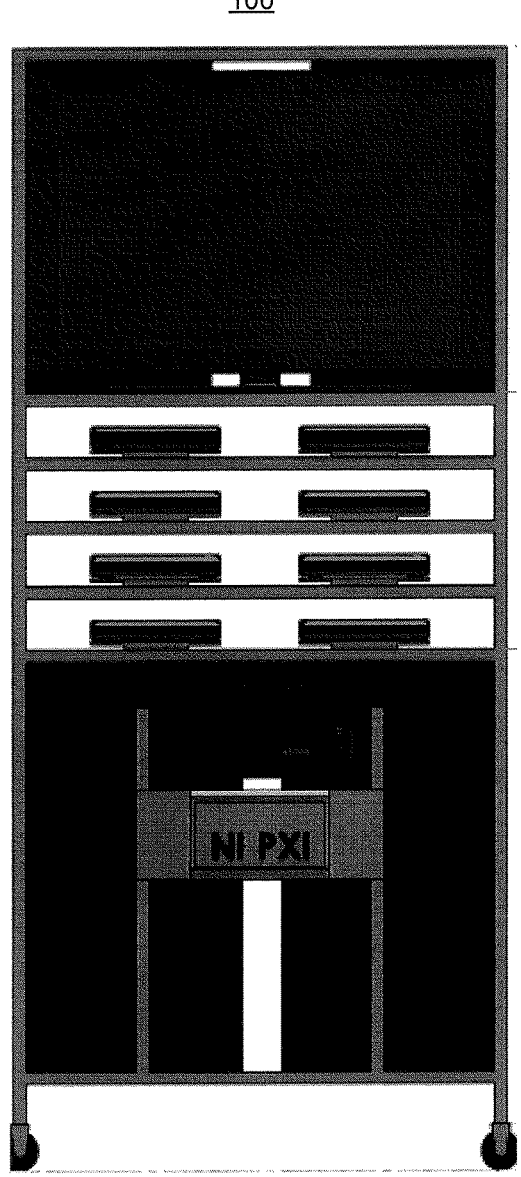
FIG. 3 is a pictorial representation of a front view of the test fixture of FIG. 1 in accordance with an illustrative embodiment.

FIGS. 1-3 are a pictorial representation of a test fixture 100 in accordance with an illustrative embodiment. The test fixture 100 may be a system, stand, platform, bench, cabinet, or tool that is configured to enable a user to perform testing and formatting analysis for a set-top box. In one embodiment, the test fixture 100 is shown as a portable cabinet that may be moved to a location for testing. Media testing of one or more set-top boxes 102 may include measuring signal strength and quality including electrical characteristics (voltage, current, response time, propagation delay, jitter, etc) of the video and audio signals and comparing those signals against applicable industry standards. For example, the audio signals may be analyzed for degradation from distortion, frequency shift, DC offset, etc. Any number of signal measurements tools may measure the response of the set-top boxes 102. In addition, safety components, such as switches, breakers, and other circuits may be utilized to ensure that testing is terminated in response to hardware failures, overheating, and other potentially damaging or dangerous conditions.

In one embodiment, the test fixture 100 may include a display 104, racks 106, nested platforms 108, computing devices 110, keyboard 112, and speakers 114. The display 104 may be a television, projector, computer, monitor, tablet, wireless device, OLED screen, or any number of other display components. In one embodiment, the display 104 is a flat screen television that is set on or mounted to the test fixture 100. The display 104 may be utilized to communicate testing patterns, media content, or a sample signal to the user for user evaluation or verification.

The test fixture 100 may provide a framework that may be utilized to customize, secure, and connect various components for performing the testing and other methods herein described. In one embodiment, the racks 106 are metal supports that may be expanded as needed to receive additional nested platforms 108 for testing the set-top boxes 102. The racks 106 may include connection components, such as holes, plates, shelves, bolts, and other components for securing the components of the test fixture 100.

In one embodiment, the nested platforms 108 may be slidably mounted to the racks 106 for more easily accessing the set-top boxes 102. For example, the nested platforms 108 may be pulled out to insert or remove the set-top boxes 102 before sliding the nested platforms 108 back in. As a result, the set-top boxes 102 may be safely secured within the nested platforms 108 and electrically connected to the test fixture 100 for testing.

The computing devices 110 are one or more processing and logical components for executing testing routines, generating and processing the signals to and from the set-top boxes 102. The computing devices 110 may be one or more micro super servers, servers, personal computers, or computing devices configured for testing the set-top boxes 102. The computing devices 110 may also include fixed or programmable logic that is utilized to perform the testing. The software and instructions utilized by the computing devices 110 may be uploaded or changed as needed to perform the testing. The computing devices 110 may include testing and analysis instrumentation.

In one embodiment, the rear of the test fixture 100 may be open for easily adding or removing hardware components and for interfacing with the components of the test fixture 100 for easy adaptation and updates. For example, discrete computing devices 110 may be electrically connected to the test fixture 100 for testing different makes and models of set-top boxes. The computing devices 110 may utilize a wired or wireless connection to connect to one or more databases for retrieving testing routines and storing test results. The databases may be updated to include new test routines, test instructors and software for updating the set-top boxes 102 before or after testing, cleaning, and updating.

The keyboard 112 may be slidably extended from the test fixture 100 in order to receive user input. The keyboard 112 may be part of a user interface that may include a mouse, touch screen/pad, barcode scanner, or other peripheral components for receiving user input. The speakers 114 and display 104 may be utilized to audibly and visually communicate formatted content from the set-top boxes 102 for the user to verify functionality. The eyes and ears of one or more users may be as valuable as any automatic tests to verify the functionality of the set-top boxes 102 and to verify the testing process is proceeding correctly.

In one embodiment, the test fixture 100 may include one or more mechanical arms operable to press buttons, turn knobs, or otherwise physically interface with the set-top boxes 102 during automatic testing. The mechanical arm may utilize x-y navigation similar to those utilized by printing and plotting devices to select the buttons. The mechanical arm may be programmed based on user interaction or based on information or coordinates entered into the test fixture. For example, a program executed by the test fixture 100 may ensure that physical testing of exterior features of the set-top boxes 102 are performed.

The test fixture 100 may execute tests of any number of test categories (and associated tests, programs, or scripts), such as boot-up tests, internal tests, video tests, audio tests, remote control tests, Ethernet tests, HPNA tests, hard disk drive tests, and LED and buttons tests. The test categories may include individual tests including, but not limited to: set-top box information, memory, USB, MS key verification, boot software check, application flash, analog video, HDMI output, RF modulator, infrared remote key display, Ethernet ping, Ethernet bandwidth, HPNA ping, HPNA bandwidth, HDD test, HDD cleaning, LED, buttons, analog audio, digital audio (optical and coaxial), video tuner, application flash cleaning, infrared receiver, boot software upgrade, and application software. The test fixture 100 performs to both NTSC and PAL standards in addition, the test fixture 100 is configurable to any desired standard set forth by equipment provider's gold standards of testing within a particular network and equipment. The test fixture 100 may test various formats, standards, and protocols, such as standard definition or high definition set-top boxes (e.g. 480i, 480p, 720p, 1080i content).

Figure 4:
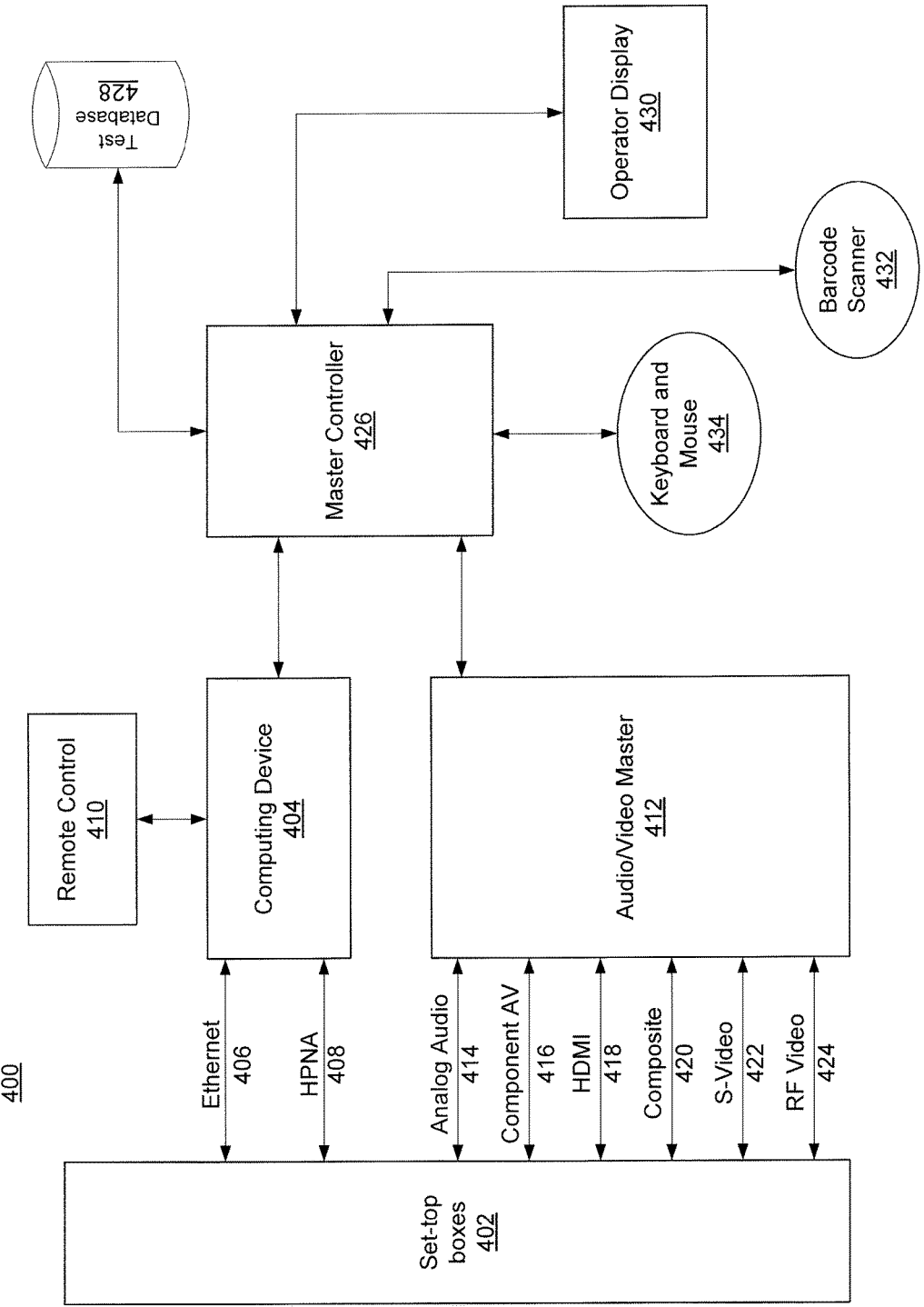
FIG. 4 is a block diagram of a test fixture in accordance with an illustrative embodiment.
Figure 5:
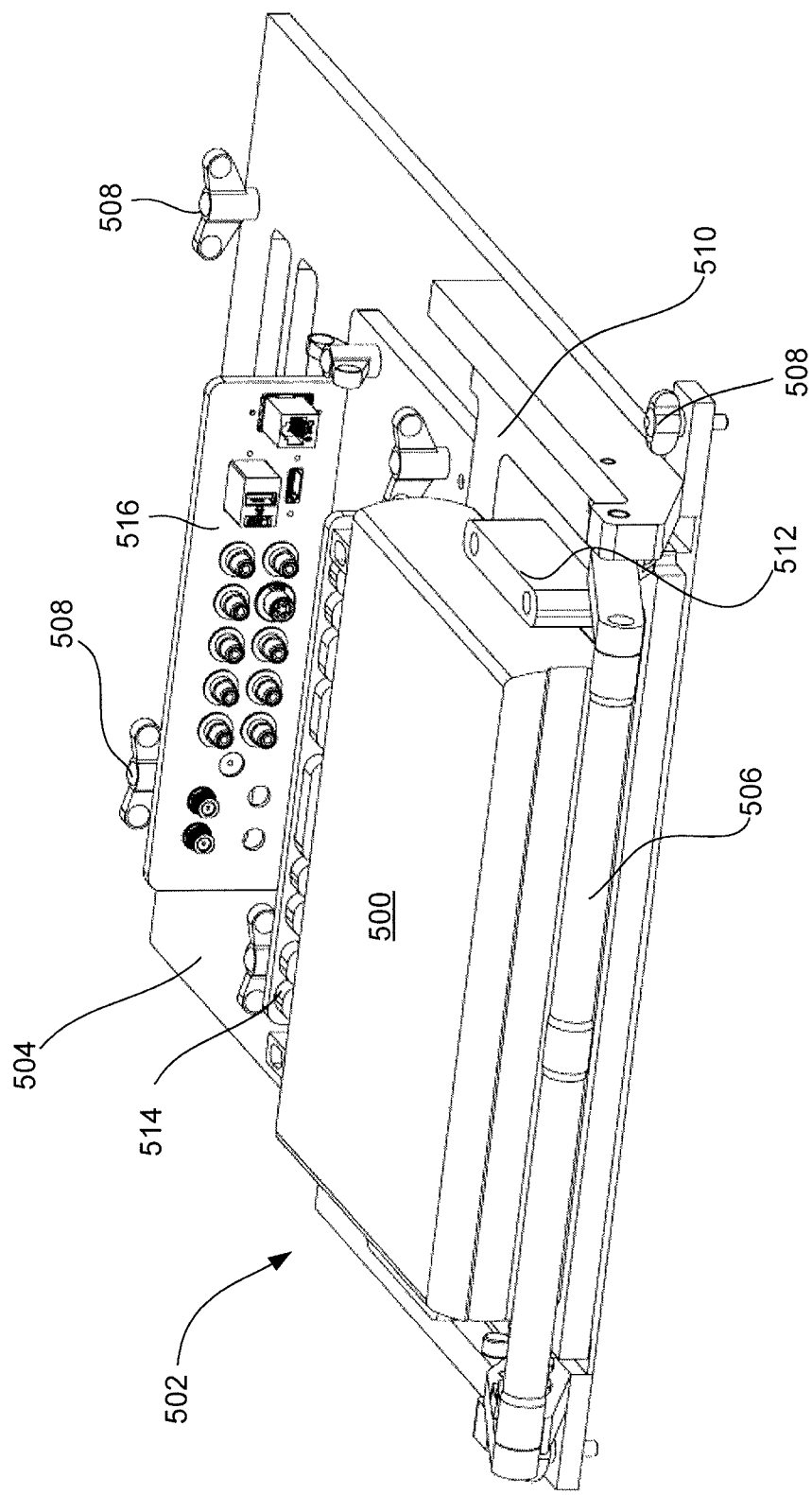
FIG. 5 is a pictorial representation of a set-top box in a nested platform in accordance with an illustrative embodiment.
Figure 6:
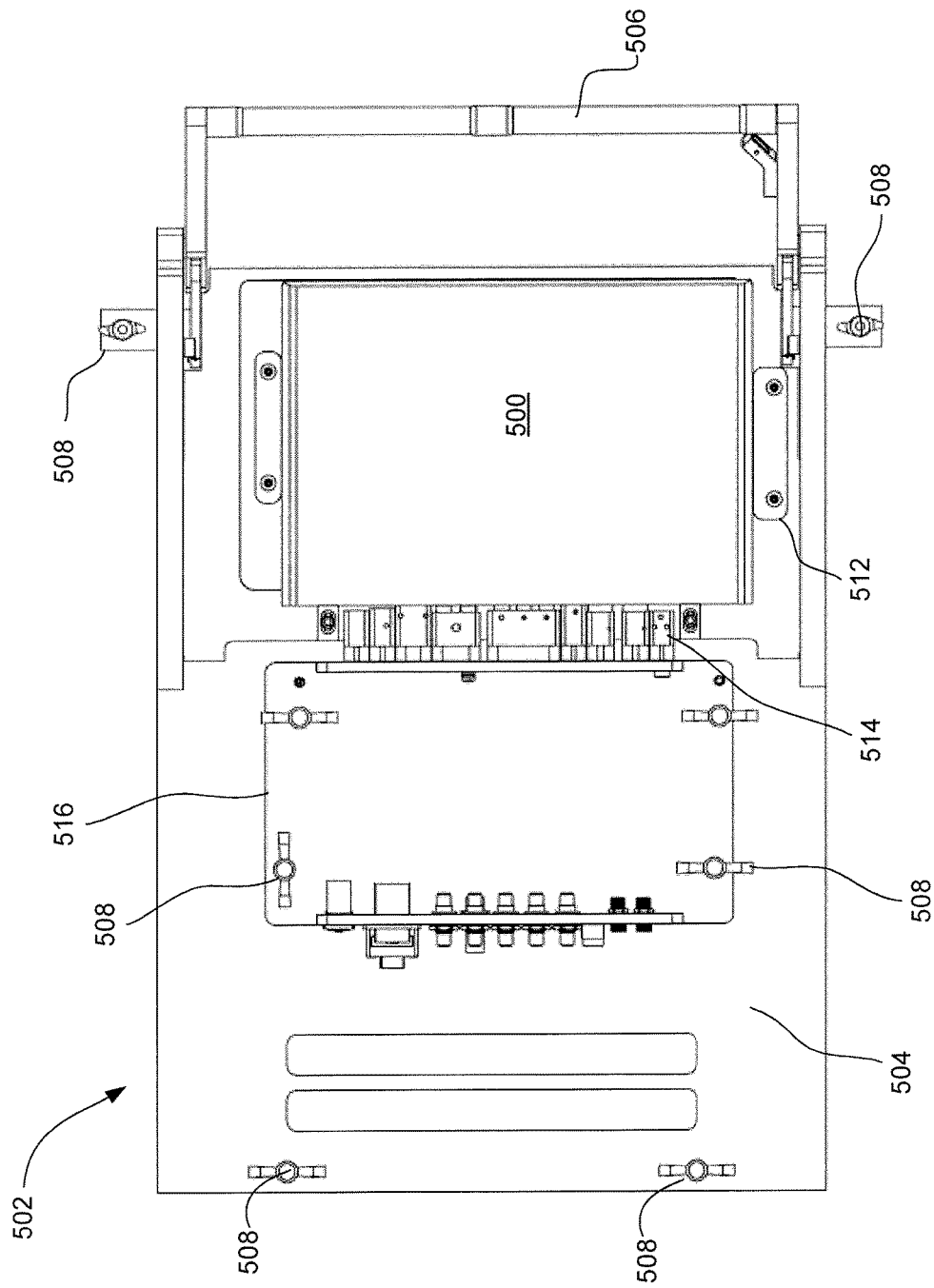
FIG. 6 is a pictorial representation of a top-view of a set-top box in a nested platform in accordance with an illustrative embodiment.

Turning now to FIG. 4 illustrating a block diagram of a test fixture 400 in accordance with an illustrative embodiment. The test fixture 400 may include any number of components that utilize innumerable different connection types. In one embodiment, the test fixture 400 includes set-top boxes 402 that represent each of the set-top boxes individually and collectively. The set-top boxes 402 may be connected to computing devices 404 through an Ethernet connection 406 and a Home Phoneline Networking Alliance (HPNA) connection 408. Other connection types including USB, CAV, DVBS, firewire, and other future or still developing connection types.

The computing devices 404 may communicate with a remote control 410. The set-top boxes 402 further communicate with an audio/video master 412 through an analog audio connection 414, a component audio video (AV) connection 416, a high-definition multimedia interface (HDMI) 418, a composite connection 420, an S-video connection 422, and an RF video 424 connection. Each of the connections between the set-top boxes 402 and the computing devices 404 and the audio/video master 412 represent multiple connections for each of the numerous set-top boxes 402. In addition, connections, such as the analog audio connection 414 and composite connection 420 may represent two or more physical connections based on the standard for the applicable interface.

The computing devices 404 and the audio/video master 412 may communicate with the controller 426. The communications may be performed utilize Ethernet PCI eXtensions for Instrumentation (PXI) or other similar connections. The controller 426 may also communicate with a test database 428, an operator display 430, a barcode scanner 432, and a keyboard and mouse 434. The computing devices 404, audio/video master 412, and controller 426 may be customized or off the shelf components or devices from companies, such as Cisco, National Instruments, Texas instruments, and Hewlett Packard.

The connections to the set-top boxes 402 are configured to power the set-top boxes 402 and communicate content to and from the set-top boxes 402. The computing device 404 may perform control and switching for each of the set-top boxes 402. For example, the computing devices 404 may include switches for routing the video signals to acquisition and analysis boards. In one embodiment, the test fixture 400 may share access to acquisitions boards and testing instrumentation. The controller 426 may lock out audio, video, and/or testing for all other set-top boxes 402 when a single set-top box is being tested. The computing devices 404 may input parameters or inputs that are required to test the set-top boxes 402.

The computing devices 404 may include multiple computing devices that communicate with the set-top boxes 402 to ensure that the testing may occur in parallel without interference from testing of the other set-top boxes. Each of the computing devices 404 may run a separate screen and clean program for testing and verifying the set-top boxes 402. For example, the controller 426 may control the one or more computing devices 404 through a telnet session or other communications, session, or link.

In one embodiment, the computing devices 404 include multiple video and audio switches (e.g. four NI-PXI-2593 switches, a composite video, blanking, and sync (CVBS) switch, S-video switch, audio switch) with muxes, an RF switch, an HDMI switch, component/audio matrices, an Ethernet switch (e.g. connecting the controller 426 to the computing devices 404), demodulators (e.g. coax video to RCA video), multiple computing devices (e.g. 8 micro servers corresponding to each of the set-top boxes 400), a keyboard and point device, a monitor/display, a bar code scanner, and multiple HPNA/Ethernet bridges. The computing devices 404 and other components may be mounted in a chassis of the test fixture 400 which may include racks and rails within a cabinet with wheels that is portable. In one embodiment, the switches described may allow multiple set-top boxes 402 to be connected at once for parallel testing.

In one embodiment, the computing device 404 may utilize the remote control 410 to control the set-top boxes 402. For example, infrared or Bluetooth signals may be utilized to initiate testing and functionality of the set-top boxes 402. Due to reliance on remote controls, testing using the remote control 410 may be critical to ensure the full functionality of the set-top boxes 402. Any number of other radio frequency, wireless or other signals may be utilized by the remote control 410 to interface with and test the set-top boxes 402.

The audio/video master 412 may include a number of micro super servers (e.g. 8 units) which provides independent computation abilities from each of the set-top boxes 402 to master controller 426. The master controller 426 processes all data between set-top boxes 402, audio video equipment, all interface devices and control application programming.

The audio/video master 412 measuring equipment is modular based therefore adding to flexibility of utilizing additional configurations and enabling expansion as needed. The electronic and structural framework of the test fixture include multiple measuring and processing devices capable of delivering functionality and any number of stimuli as listed below which may then be processed by the master controller 426:

analysis of HDMI/DVI, composite, S-video, and component analog video (including HDTV and VGA); supports digital video analysis through Full HD (1080p 60 Hz) video; comprehensive audio analysis with single or multiple tones, amplitude and frequency sweeps, and more; analog audio generation and acquisition (e.g. acquisition at 204.8 kS/s with 24 bits of resolution); and digital audio acquisition for S/PDIF (e.g. 8-, 16-, 20-, and 24-bit depths from 22 to 192 kHz).

The controller 426 coordinates and controls the functionality of the computing device 404 which may include one or more devices. The controller includes coordinating software to control the test sequences initiated by the computing devices 404. The controller 426 may also retrieve testing programs, routines, and instructions from the test database 428. Similarly, testing results and an associated device identifier, such as serial number, hardware code, or other information, may be stored in the test database 428. The controller 426 determines the positioning of each of the set-top boxes 402 in the nested platforms and tracks this information along with the specific test results for each of the set-top boxes.

In one embodiment, the controller 426 may execute a master program for controlling the computing devices 404. However, additional programs may communicate with each other or may include master and servant programs. The controller 426 may execute any number of tests sequences, functions and drivers. In addition, the controller 426 may access inputs from one or more test input files stored locally in the controller 426 or stored in the test database 428. Similarly, the test results may be saved to the test database 428.

The operator display 430, barcode scanner, 432, and keyboard and mouse 434 are the user interface components for the user to receive results and status updates, and provide input. The barcode scanner 432 may be utilized to scan a bar code, numbers, engravings, UPC, or other markings of the set-top boxes 402 corresponding to a selected position in the test fixture 400 for performing the testing. For example, a first device may be scanned by the barcode scanner 432 with the set-top box being placed into a first slot or nested platform. The nested platform may also have an associated barcode so that the user may scan in and save the relative positions of each of the set-top boxes 402 allowing the user to more efficiently perform documentation and testing of the set-top boxes 402 and automatically organize test results. Alternatively, the user may utilize the keyboard and mouse 434 along with the operator display 430 to manually enter information for each of the set-top boxes 402.

In another embodiment, the barcode scanner 432 may be a radio frequency identification (RFID) tag reader. The RFID tag reader may identify or retrieve information from an RFID tag integrated with the set-top boxes 402 or nested platforms. The test fixture 400 may automatically configure the tests based on the RFID tag or the barcode and the testing information associated with the identifier in the test database 428 to quickly and efficiently implement testing.

The test fixture 400 includes a number of hardware and software components including processors, memories, busses, interfaces, ports, wires, jumpers, cards, circuits, demodulators, converters, bridges, adapters, logic, and other standard computing and communications components that are not described for purposes of simplicity.

The processor may be circuitry or logic enabled to control execution of a set of instructions. The processor may be microprocessors, digital signal processors, application-specific integrated circuits (ASIC), central processing units, or other devices suitable for controlling a set-top box including one or more hardware and software elements, executing software, instructions, programs, and applications, converting and processing signals and information, and performing other related tasks. The processor may be a single chip or integrated with other computing or communications elements.

The memory is a hardware element, device, or recording media configured to store data for subsequent retrieval or access at a later time. The memory may be static or dynamic memory. The memory may include a hard disk, random access memory, cache, removable media drive, mass storage, or configuration suitable as storage for data, instructions, and information. In one embodiment, the memory and processor may be integrated. The memory may use any type of volatile or non-volatile storage techniques and mediums.

The memory and/or database may store data, information, specifications, or configurations for a number of set-top boxes 402 and associated testing equipment. For example, the testing database 428 may store configurations of the testing routines for a number of different models, device types, adapters, versions, and so forth. As a result, a user interface of the operator display may more accurately indicate to the user whether the set-top boxes 402 has passed one or more tests based on criteria, parameters, thresholds, percentages and requirements for the set-top box as stored in the testing database 428. The memory and the testing database 428 may be updated through a network connection as previously described. Additionally, the user interface may include other interfaces, such as a USB port for updating the testing database 428 through a thumb drive or other externally connected device or storage element. The memory and the testing database 428 may store testing scripts that run one or more tests on the set-top boxes 402 in parallel, simultaneously, or in series.

In one embodiment, the memory or the testing database 428 may store a table. The table may be utilized to look up data or information for configuring the test fixture 400 and adapter modules. For example, based on user input received through the peripherals or information automatically determined by the test fixture, the table may prepare test routines for testing the set-top boxes 402. The table may also be utilized to determine functionality or non-functionality of the set-top boxes 402 based on the performance characteristics measured during testing of the set-top boxes 402. For example, based on returned data, audio and video characteristics, and threshold values for voltage, current, and resistance, the table may display a pass or fail indicator through the user interface. The table may store information, data, and a number of threshold values for passing, failing, or generating a diagnostic report for each of the set-top boxes 402.

In one embodiment, different OEMs or service providers may have specific test configurations, scripts, specifications, tolerances, or parameters that are required for set-top boxes 402 or that are utilized or associated with their company, products, or network. In one embodiment, updates are received directly from an OEM or service provider for use by the testing party. In another embodiment, the barcode scanner 432 may retrieve information that is used to automatically determine the testing parameters and information associated with the set-top boxes 402.

Turning now to FIGS. 5-8 illustrating different views of a set-top box 500 in a nested platform 502 in accordance with an illustrative embodiment. The nested platform is a testing platform for securing the set-top box 500 and electrically connecting the set-top box 500 to the test fixture. The nested platform 502 may include a plate 504. The plate 504 may allow different components to be attached to and integrated with it for customizing the nested platform 502. The nested platform 502 may include a handle 506 for sliding a portion of the nested platform 502 and set-top box 500 out for easy access by a user. In one embodiment, the handle 506 may be pivotally attached to the nested platform 502 and may be folded back during insertion and removal and positioned down in a lock position during testing.

The nested platform 502 may include bolts 508 for attaching the nested platform to sliding arms, racks, shelves, or other structural components of the test fixture. The bolts 508 may include knobs, handles, toggles, or other components that allow the bolts be attached with or without tools, such as screwdrivers or wrenches. The nested platform 502 is designed to be easily attached to or removed from the test fixture. As previously described, multiple nesting platforms may be utilized to scale the test fixture for a desired number of set-top boxes.

The nested platform 502 may further include a base plate 510. The base plate 510 is a support structure or framework for supporting or holding a portion of the set-top box 500. For example, the base plate 510 may support a bottom portion of the set-top box 500. The base plate 510 may attach to the plate 504. The base plate 510 may be a solid, lattice, honeycomb, checkerboard, or other structure.

In one embodiment, the nested platform 500 is composed entirely of non-conducting or non-metallic elements in order to provide accurate RF testing results if necessary. Metal within any of the components of the nested platform 500 may adversely reflect or absorb RF signals generated by the set-top box, thereby affecting the results of the testing. The base plate 510 and nested platform 500 may be of any size to accommodate large set-top boxes as well as small network devices.

In one embodiment, the base plate 510 is a support configured to receive a particular model of set-top box. The base plate 510 allows the set-top box 500 to be securely and stably positioned or nested during testing. For example, the base plate 510 may be sized to receive a specific model of set-top box for testing. The base plate 510 may be or include a mold or cut-aways operable to support all or a portion of the set-top box 500. The shape of the mold may be determined by outer dimensions of the set-top box 500. The orientation of the base plate 510 may be determined by the positioning of the internal or external and optimal position of the set-top box 500. The set-top box 500 may be sized and configured to support any of the set-top boxes herein described.

The guides 512 may be arms or supports that secure the set-top box 500 when placed in the nested platform 502. For example, the guides 512 and base plate 510 may keep the set-top box 500 from shifting when the test fixture is moved. In one embodiment, the guides 512 are detachable arms that may be adjusted to the size of the set-top box 500. The base plate 510 and/or guides 512 are preferably sized such that the set-top box 500 is held securely or snugly during testing. The base plate 510 ensures that each set-top box is uniformly secured (position and location) during testing for helping a user more easily connect the set-top box 500 to the adapter module 514. The nested platform 502 and overall test fixture provides a system and method for performing testing and duplicating testing between different parties. In addition, a single test fixture may be utilized to test multiple devices.

In one embodiment, the set-top box 500 is positioned on the base plate 510. The set-top box 500 may be secured by a number of guides 512. The guides 512 may be removable or may be slidably attached to the base plate 510. The guides 512 are supports or stops that support the set-top box 500. In particular, the guides 512 may secure the set-top box 500 and prevent the set-top box 500 from slipping or moving during testing or once attached to an adapter module 514.

The guides 512 may physically secure the set-top box 500 to the nested platform 500. The guides 512 may include any number of shapes. In one embodiment, the guides are rectangularly shaped. In another embodiment, the guides 512 are a flattened-oval shape with rounded edges and made of a rubber composite for abutting the set-top box 500. The guides may also be L-shaped, rounded, or semi-circular to accommodate a corner of the set-top box 500 or other distinct shapes.

Bolts or set screws may pass through holes or slots defined by the guides 512 in order to entirely remove the guides 512 from the base plate 510 and corresponding nested platform 500. In another embodiment, the set screws may only be loosened (without disengaging the guides entirely), thereby allowing the guides to be moved or positioned on the base plate. In one embodiment, the guides may be moved along slits or tracks defined in the base plate 510 or plate 504 to reach a desired position.

A base plate 510 may include a cut-out at the edges of the set-top box 500 allowing a user to easily remove the set-top box 500 after performing testing. Additionally, other pop-out mechanisms, such as a lever under the set-top box 500, may be incorporated with the base plate 510 for removing the set-top box 500 after testing.

The nested platform 502 may be compatible with any number of base plates 510 or molds. The configuration of the base plate 510, guides 512, and adapter module 514 may vary by set-top box. Slits within the plate 504 and base plate 510 may be utilized to position the components of the nested platform 502 to meet the physical configuration of each set-top box 500.

The components that compose or are attached to the nested platform 500 may be molded, manufactured, or created from a single material or multiple materials. For example, the nested platform 500 may be composed entirely of plastic, composites, wood, rubber, nylon, or any number of materials that maximize or enhance the testing as performed for the set-top box 500 positioned on the nested platform 500. In one embodiment, the test fixture is formed from acetal (such as Delrin manufactured by DuPont, a homopolymer acetal), a thermoplastic. Acetal and other similar thermoplastics have the ability to absorb electromagnetic energy maximizing the effectiveness of the RF testing. In one embodiment, the bolts or set screws may be made from nylon. The nested platform 500 and components may be generated utilizing a Computer Numerical Control (CNC) machine, molded from individual parts, or custom made utilizing hand tools.

The adapter module 514 is an electrical and mechanical hardware interface to the ports, receptacles, jacks, inputs, and outputs of the set-top box 500. The adapter module 514 may be utilized to power, and communicate and receive signals to the set-top box 500 through hardware connections (both male and female connections and connectors). The adapter module 514 may include any number of connection points as previously described in FIG. 4. For example, the adapter module 514 may include male connectors for simultaneous mechanical engagement of all the female connectors of the set-top box 500. In one embodiment, the adapter module 514 interfaces directly with the electrical, processing, and communications components of the test fixture. For example, the adapter module 514 may communicate with the test fixture utilizing traces, wires, cables, fiber optics, or other communications or signal mediums known in the art. The base plate 510, stops 512, and adapter module 514 are operable to receive the set-top box 500 as a customizable docking station.

The adapter module 514 may correspond to a specified model or configuration of a set-top box 500. The user may select one of multiple adapter modules 514 that correspond to a selected set-top box 500. As previously indicated, the adapter module 514 may include an identifier or markings that may be associated with the nested platform 502 through scanning, automatic detection, or user entries during testing. In one embodiment, the test fixture may be operable to test a single type of set-top box at a time. In another embodiment, the test fixture may test multiple different types or configurations of set-top boxes in response to configuration of the nested platform 502 with an adapter module In one embodiment, the adapter module 514 may be connected to an interface 516. The interface 516 may be utilized as a generic connector to the test fixture. The interface 516 is similarly an electrical and mechanical hardware connector to the test fixture. As a result, even if a different adapter module 514 is attached to the plate 504 or base plate 510, the interface 516 may still be utilized to connect to the test fixture. For example, a number of cables and wires may connect the computing device and testing instrumentation of the test fixture to the interface 516. The adapter module 514 and interface 516 may be connected through fixed, flexible integrated, or independent connections. In one embodiment, the adapter module 514 and interface 516 are integrated.

The adapter module 514 and interface 516 may include a vertical portion extending perpendicularly from the plate 504 and a horizontal portion for connection each of the adapter module 514 and interface 516 to the plate 504. The adapter module 514 and interface 516 may be connected to the plate 504 through slots, holes, slits, or other connection components known in the art.

Figure 9:
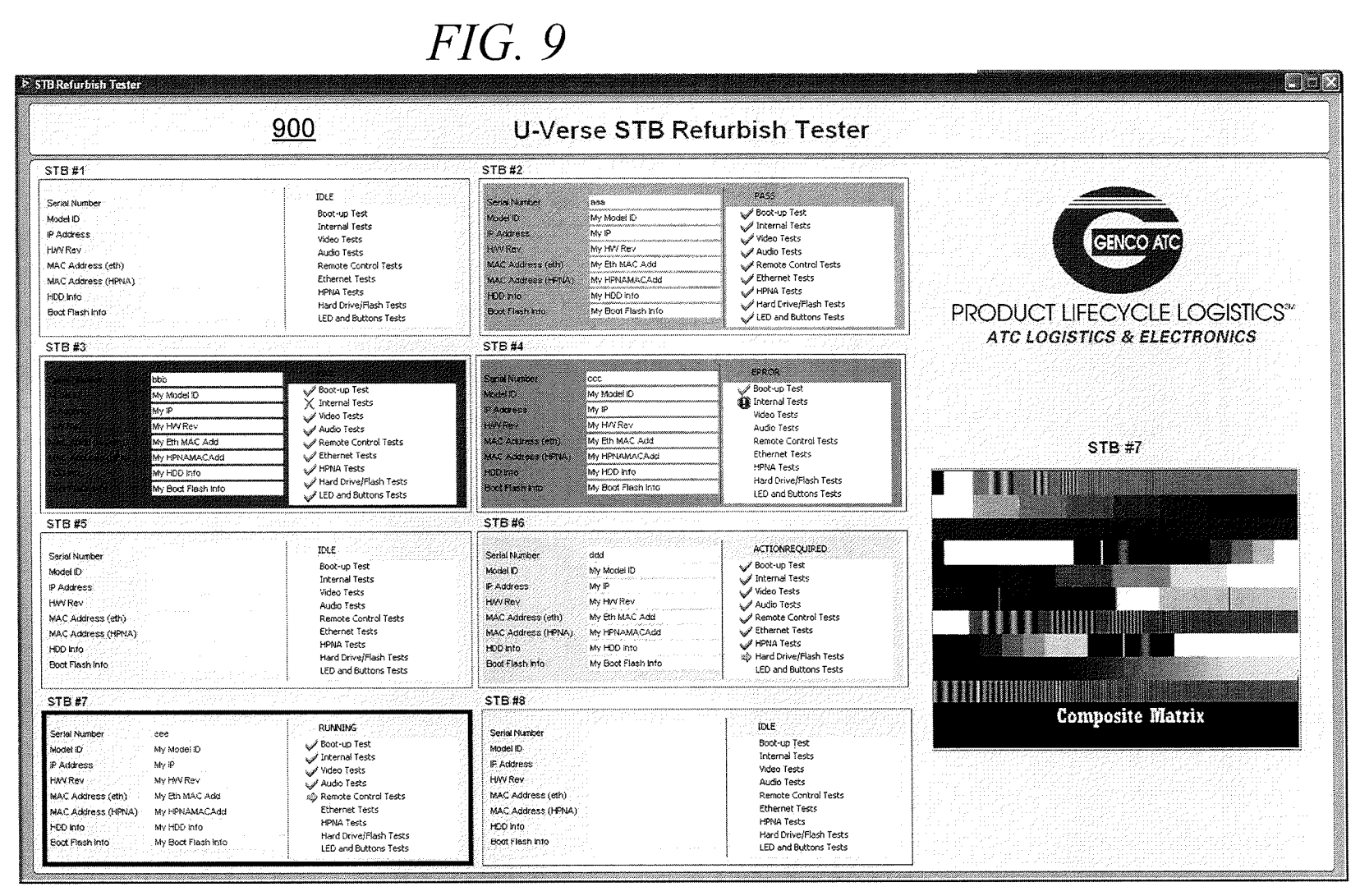

Turning now to FIG. 9 illustrating a pictorial representation of a graphical user interface 900 in accordance with an illustrative embodiment. The graphical user interface 900 may be utilized to communicate information to a user for testing set-top boxes. In one embodiment, the graphical user interface 900 includes a number of menus and interfaces that may be navigated to perform testing. The graphical user interface 900 allows the user to interact with the automatic execution of test sequences for set-top boxes.

In one embodiment, the graphical user interface 900 may display the tests run in parallel or using a sequential process model. The graphical user interface 900 may be operable to display results in real-time based on the testing status and results. The graphical user interface 900 may display the serial number, model, firmware, HDD size, and manufacturing information deemed necessary to be displayed from the se-top box member. The graphical user interface 900 may also display information regarding fixtures, adapter modules, or other components associated with testing and the relative positioning of these components. The results of the graphical user interface 900 may be displayed in different colors. For example, white with a black border may be the default color, green may indicate the set-top box passed, red indicates a failure, and orange may indicate an application error occurred or set-top box was removed prior to test completion. A yellow color may indicate user attention is required. The user interface 900 may allow a user to quickly evaluate the parallel testing of the set-top boxes as results are monitored and parsed. In one embodiment, tests for audio/video tests, remote tests, and only LED and button tests may require specific user interaction. These user interactions may be automated with mechanical or electrical station devices.

The graphical user interface 900 may graphically illustrate testing for multiple set-top boxes corresponding to one or more test fixtures. As previously described, the number of set-top boxes or other electronic devices tested by the test fixture is not limited. In another embodiments, the graphical user interface 900 may be transmitted to other local or remote displays, tablets, wireless device, or communications or computing devices utilized by a user during the testing of the set-top boxes.

The user interface 900 may display the status of the testing, test results, and video content from the set-top boxes for evaluation by the user. For example, a composite matrix 902 is shown for a seventh set-top box being tested. The composite matrix 902 may include patterns, a color bar, a luminance bar, and a composite pulse or multi-bursts. Video content may also be played to the user interface by any of the set-top boxes.

In one embodiment, the information and data for the set-top boxes may include a serial number, model identification, IP address, hardware revision, MAC address (Ethernet and/or HPNA), HDD info, and boot flash information.

The graphical user interface 900 may display tests results, such as pass, fail or reasons for failing. In one embodiment, the tests may include boot-up, internal, video, audio, remote control, Ethernet, HPNA, memory (e.g. hard drive and flash), and LED and button tests. Detailed parametric date in file form may be available for determining root cause, process capability index, and other quality metrics for reporting. In some cases, portions of the tests may be performed automatically with other tests being performed based on manual user selections. For example, the user interface 900 may prompt the user to push buttons on each of the set-top boxes or a remote control to perform the necessary testing.

Figure 10:
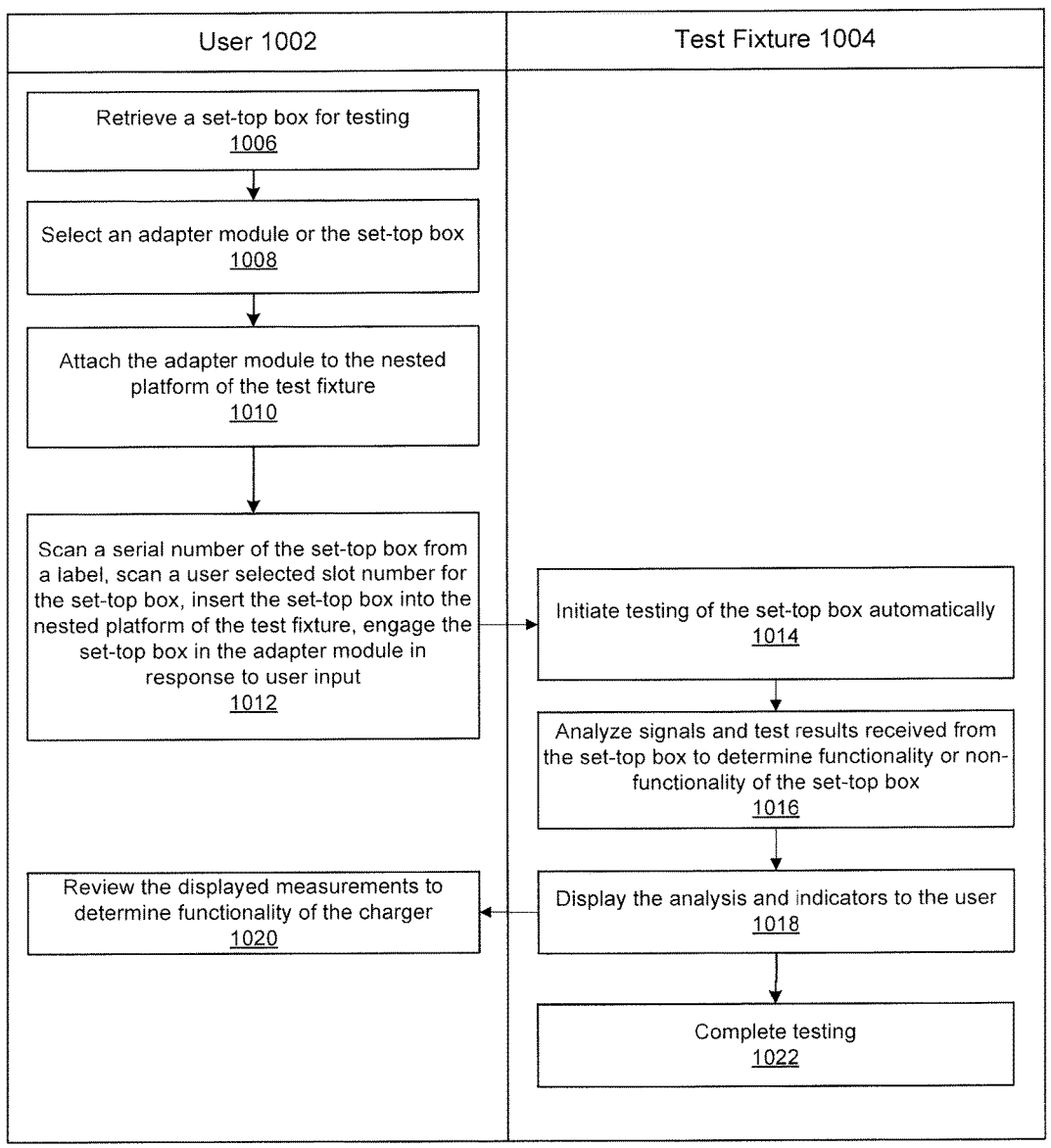
FIG. 10 is a flowchart of a process for testing a set-top box in accordance with an illustrative embodiment.

FIG. 10 is a flowchart of a process for testing a set-top box in accordance with an illustrative embodiment. The process of FIG. 10 may be implemented by a user 1002 and a test fixture 1004 in accordance with one embodiment. The order of the steps in FIGS. 10 and 11 may be varied based on environment, conditions, and user preferences.

The process may begin with the user 1002 retrieving a set-top box for testing (step 1006). The set-top box may be tested as part of a returns, replacement, refurbishment, or repair process or other procedure that may require verification of the functionality of the set-top box.

Next, the user 1002 selects an adapter module for the set-top box (step 1008). The adapter module represents adapters or interfaces for testing the specific model or type of set-top box. The base plate and other components of the nested platform may similarly be selected and connected for properly receiving each of the set top-boxes. The adapter module may include labels, markings or other indicators associating each of the module types with one or more makes, models, or types of mobile devices for identification by a user or automated element, such as a scanner. If the adapter module was previously connected for testing a similar or identical model of set-top box, step 1002 may be skipped.

Next, the user 1002 attaches the adapter module to the nested platform of the test fixture (step 1010). In one embodiment, wired or wireless connections may be established between the adapter module and the electrical components of the test fixture 604.

Next, the user 1002 scans a serial number of the set-top box from a label, scans a user selected slot number of the set-top box, inserts the set-top box into the nested platform of the test fixture 1004, and engage the set-top box in the adapter module in response to user input (step 1012). The nested platform may be extended from the test fixture 604 utilizing a handle or other components to more easily insert or remove the set-top box. The test fixture 1004 may include a wireless or wired a laser bar code scanner or RFID scanner for scanning the set-top box and applicable slot of the test fixture 1004. In one embodiment, during step 1012, the user 1002 may pull down a handle to engage the set-top box in the adapter module.

Next, the test fixture 1004 initiates testing of the set-top box automatically (step 1014). Step 1004 may also involve retesting the set-top box. The testing may be performed in response to the user 102 scanning the set-top box and fixture selection (slot). As previously described, the adapter module must be electrically connected to the test fixture in order for the set-top box to be energized and subsequently tested. In one embodiment, each set-top box may be automatically tested in response to being connected to the test fixture. In another embodiment, the user may initiate the testing for each of the set-top boxes. For example, the user may provide a command code to begin the process. If portions of the test fail, the user may be prompted to restart the test, rerun specific tests, run manual tests, or use a different process.

In one embodiment, before the testing may be initiated, a telnet session may be started and root access to the set-top box may be required. In addition, the serial number or other identifier scanned by a barcode scanner or entered manually may be compared against a serial number automatically retrieved from the firmware of the set-top box. For example, the process may be restarted if the serial number or other identifier is not verified within a designated time period. In addition, if the serial numbers do not match the testing sequence is aborted. The tests performed may be selected automatically or manually by a user. For example, a list of check boxes corresponding to tests may be selected by the user to initiate specific tests.

Next, the test fixture 1004 analyzes signals and tests results received from the set-top box to determine functionality or non-functionality of the set-top box (step 1016). The testing instrumentation of the test fixture 1004 may compare signals and results against thresholds, ranges, parameters, or expected results.

Next, the test fixture 1004 displays the analysis and indicators to the user 1002 (step 1018). The analysis and indicators may be displayed in alphanumeric format or utilizing visual indicators, such as a user interface, green or red LEDs, or other displays to indicate that the set-top box has passed or failed according to specified parameters stored by the set-top box or utilized by the user 1002. In addition, audio and video content including test images, sounds, or content may be communicated to the user 1002 through the test fixture 1004 for analysis.

Simultaneously, the user 1002 reviews the displayed analysis to determine functionality of the set-top box (step 1020). The user 1002 may provide additional feedback for user specific audio, video, light, remote, or button tests to pass or fail each of the set-top boxes.

Next, the test fixture 1004 completes testing (step 1022). In one embodiment, the test fixture 1004 may save the test results locally or to an external device or database. The user 1002 may electronically or physically mark the set-top boxes that pass or fail for subsequent analysis. For example, a fail code may be associated with a serial number of a set-top box that failed one or more of the tests run by the test fixture 1004.

Figure 11:
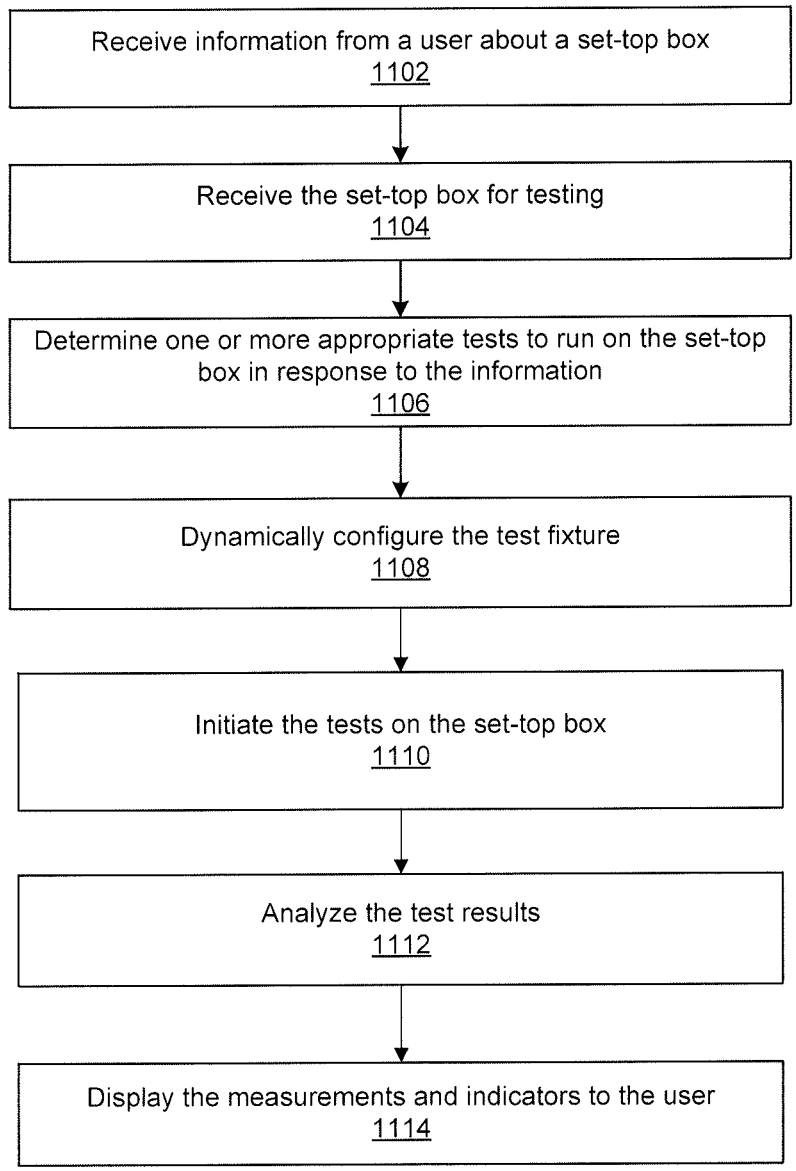
FIG. 11 is a flowchart of another process for testing a set-top box in accordance with an illustrative embodiment.

FIG. 11 is a flowchart of another process for testing a set-top box in accordance with an illustrative embodiment. The process of FIG. 11 may be implemented by a test fixture based on interaction with a user to test a set-top box. The process of FIG. 11 may be implemented on multiple set-top boxes individually, simultaneously, sequentially, or with partial overlap. The process may begin by receiving information from a user about a set-top box (step 1102). The information may include functional parameters for the set-top box. For example, the information may specify a make, model, hardware, firmware, operating system version, or other information associated with the set-top box. In one embodiment, the test fixture may include a scanner, such as a barcode scanner that scans a barcode or other identification information on the set-top box.

Next, the test fixture receives the set-top box for testing (step 1104). For example, the set-top box may be electrically interfaced with the test fixture and the set-top box secured for testing.

Next, the test fixture determines one or more appropriate tests to run on the set-top box in response to the information (step 1106). For example, particular brands of set-top boxes may require a specified testing routine from an OEM or service provider to perform the required tests and scan for CPI.

Next, the test fixture dynamically configures the test fixture (step 1108). The test fixture sets the number and types of tests as well as fixed or variable testing parameters and how the test results are recorded or communicated.

Next, the test fixture initiates testing on the set-top box (step 1110). For example, the test fixture may power the set-top box and automatically initiate testing in response to determining the set-top box is interfaced with the test fixture.

The test fixture analyzes the test results (step 1112). The analysis may be established based on pre-set criteria, thresholds, or parameters set by the set-top box manufacturer or a service provider that provides the set-top box to customers. During step 1112 the test fixture processes signals and data to determine whether the set-top box has passed a number of tests.

Next, the test fixture displays test measurements and indicators to the user (step 1114). The test measurements and indicators are displayed for the user to evaluate and to take additional actions, such as marking defective set-top boxes, performing CPI removal, updating software, and performing other necessary steps. The measurements and indicators may also be stored and/or communicated to an external device.

In one embodiment, the described process may be looped or repeated for different modes or connectors of the set-top box. For example, standard definition outputs and features may be tested before moving to high definition outputs.

Figure 12:
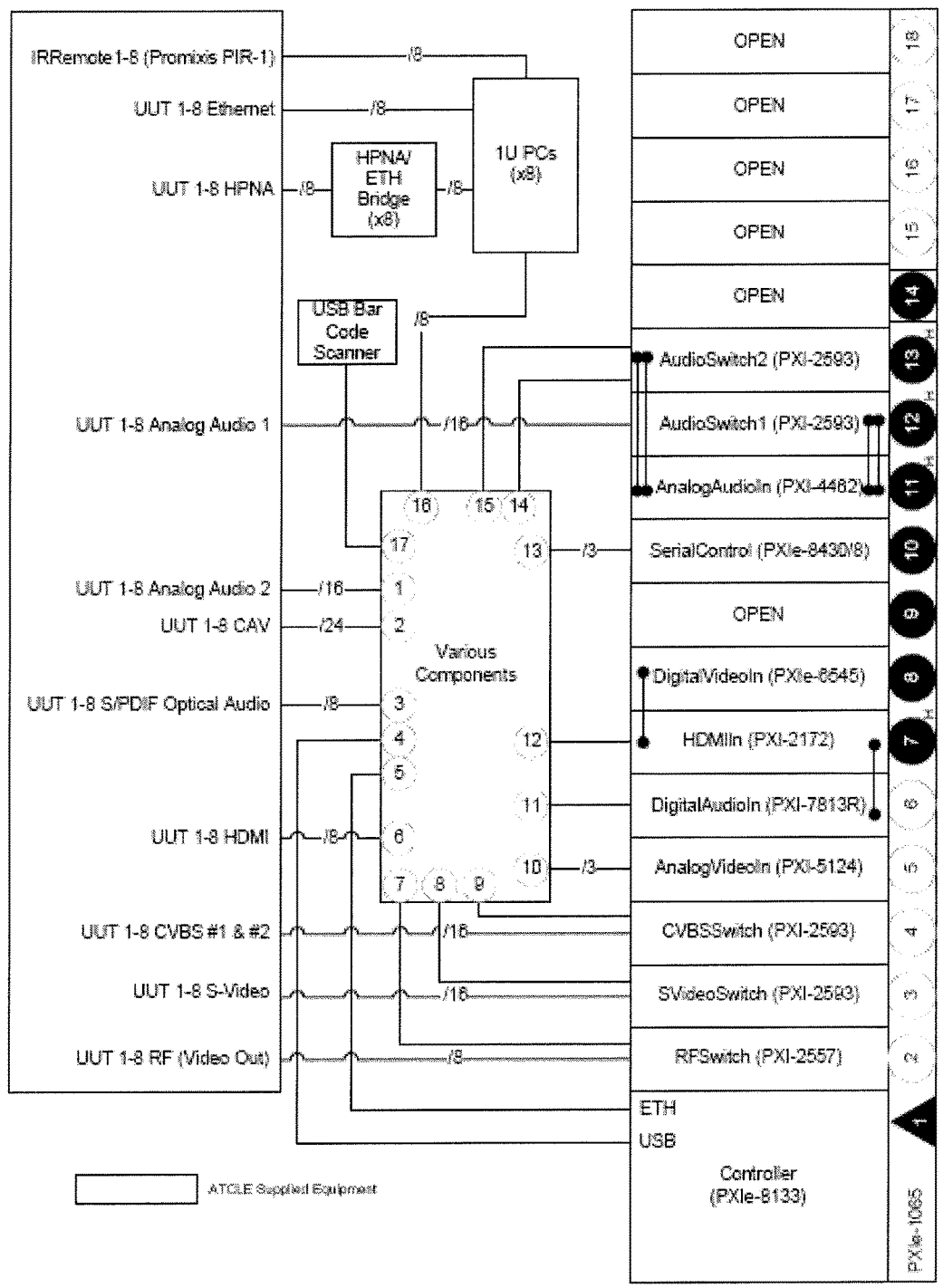
FIG. 12 is a pictorial representation of testing instrumentation and connections of the test fixture of FIG. 4 in accordance with an illustrative embodiment.
Figure 13:
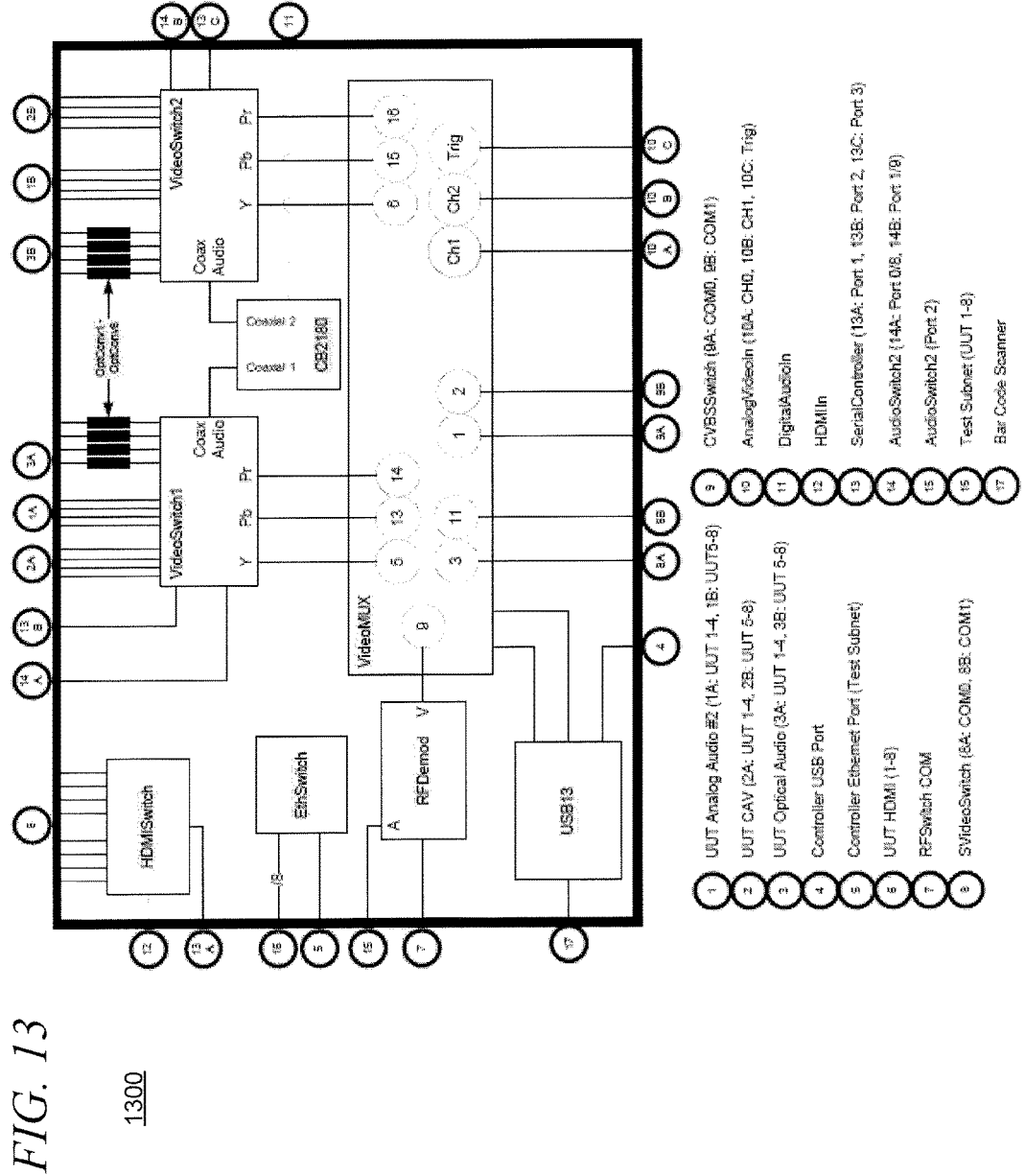
FIG. 13 is a pictorial representation of testing instrumentation and connections of the test fixture of FIG. 4 in accordance with an illustrative embodiment.

FIGS. 12 and 13 are an example of testing instrumentation and connections of the test fixture of FIG. 4 in accordance with an illustrative embodiment. FIG. 12 shows one example of a system 1200 for use in the test fixture. FIG. 13 shows further a further example of a system 1300 for use in the test fixture. FIGS. 12 and 13 are shown as examples of components of the test fixture configured for one set-top box and illustrate the components may be connected for a particular set-top box and are not meant to be limiting.

The systems 1200 and 1300 may be utilized to both switch between video and audio input to the set-top box and video and audio outputs received from the set-top box. As a result, redundant testing equipment is not required to test the multiple set-top boxes in parallel. Instead, the systems 1200 and 1300 are operable to switch for testing each of the set-top boxes. In another embodiment, the systems 1200 and 1300 may switch between two or more sets of testing equipment.

The systems 1200 and 1300 may include several switches. The switches may allow multiple set-top boxes or units under test (UUTs) to be connected at the same time and share a single set of video and audio hardware. Any number of cables, traces or wires may be utilized to interconnect the systems 1200 and 1300 and the different components of the test fixture.

The systems 1200 and 1300 may include instrumentation for acquiring analog video signals (Analog Video In) and for digital video signals (DigitalVideoIn), such as HDMI video signals. The set-top box (e.g. UUT) may supply a modulated RF Video output on either channel 3 or 4. A modulated output may need to be converted to CVBS to allow the output to be measured with a video analyzer (i.e. NI Analog Video Analyzer (PXI) VideoMaster.

The conversion from RF Video to CVBS may be performed using a RF Coax Video to RCA Video Audio Demodulator (RFDemod). The signals from the set-top boxes may be connected to the RFSwitch. The common port of the RFSwitch is then connected to the RFDemod. The HPNA ports may be converted to Ethernet using HPNA/Ethernet bridges. The bridges may reside on a component shelf within the test fixture with an RF cable connecting the bridges to the test fixture.

Some set-top boxes may contains two CVBS output ports. The signal from the output ports may be communicated through a switch to select the appropriate set-top box and the resulting signal may then be sent to a VideoMUX. The CVBS signals of the test fixture may be directly connected to the CVBSSwitch. The COM0 and COM1 of the CVBSSwitch may be connected to the VideoMUX.

In one embodiment, the VideoMUX may provide connections for 2 combined audio video (CAV) signals. To reduce the multiple CAV signals down to two, a pair of video matrices (e.g. Gefen 4×4, VideoSwitch1 and VideoSwitch2) may be used. The Y, Pb, and Pr signals for one set-top box may use the same cable. These cables are connected between the video switches and the set-top boxes. The first output of each video switch may be connected to the VideoMUX.

Each set-top box may include a single S-Video output. In one embodiment, there may not be enough connections on the VideoMUX for as many as eight S-Video connections in parallel. As a result, the SVideoSwitch may be used to reduce the number of connections down to one. COM0 and COM1 on the SVideoSwitch may be connected to the VideoMUX.

The VideoMUX may provide routing for 16 signals to the 2 inputs on the AnalogVideoIn. The VideoMUX may be configured in different ways based on the number and type of video connections present. For system 1200 the VideoMUX may be configure in a "4×CVBS+2×SVideo+2×CAV" mode. There may be sixteen 16 75-Ohm BNC females on the front of the VideoMUX that connect with various video signals. For cables using an RCA connector, an RCA-to-BNC converter will be used on the front of the VideoMUX. The VideoMUX may provide the following connectivity.

VideoMux Connections
1 CVBS1 CVBSSwitch COM0
2 CVBS2 CVBSSwitch COM1
3 S-VideoYs1 SVideoSwitch COM0
4 S-VideoYs2 OPEN
5 CAV Ys1 VideoSwitch1 Ys1 out
6 CAV Ys2 VideoSwitch2 Ys1 out
7—OPEN
8—OPEN
9 CVBS3 RFDemod CVBS out
10 CVBS4 Open
11 S-VideoC1 SVideoSwitch COM1
12 S-VideoC2 OPEN
13 CAV Pb1 VideoSwitch1 Pb1 out
14 CAV Pr1 VideoSwitch1 Pr1 out
15 CAV Pb2 VideoSwitch2 Pb1 out
16 CAV Pr2 VideoSwitch2 Pr1 out
H H OPEN
V V OPEN
CH0 Output 1 AnalogVideoIn CH0
CH1 Output 2 AnalogVideoIn CH1
Sync1 S1 OPEN
Sync2 S2 OPEN
Trig Trigger AnalogVideoIn TRIG Each set-top box may include an HDMI port. In one embodiment, the system 1200 may have only a single input (HDMIIn). As a result, the multiple HDMI signals may need to be sent to an 8×1 HDMI Matrix (HDMISwitch). The common on this switch may be connected to the HDMIIn.

In one embodiment, there is one testing instrument (AnalogAudioIn) for acquiring analog audio signals and one (DigitalAudioIn) for digital (non-HDMI) audio signals. The different audio signals are connected to the system 1200 as described in the following sections. Each set-top box may include two analog audio outputs as well as analog audio on the RF output. The AnalogAudioIn device may accept two analog audio pairs. An 8×1 MUX may be required to select the appropriate set-top box to test. Set-top box analog audio

1 may be connected to the AudioSwitch1. Set-top box Analog audio #2 may be connected to VideoSwitch1 and VideoSwitch2. The analog audio outputs from the video switches as well as the single mono analog audio signal from RFDemod may be connected to AudioSwitch2. COM0 and COM1 of AudioSwitch1 may be connected to AIN0 and AIN1 of AnalogAudioIn. COM0 and COM1 of Audio-Switch2 may be connected to AIN2 and AIN3 of AnalogAudioIn.

Each set-top box may include an optical audio output. The optical audio output may connect to the DigitalAudioIn through the CB2180 connection block. The connection block may supports two optical audio inputs and two coaxial digital audio inputs. Therefore, switching may be required to reduce the number of optical audio signals to two. The existing VideoSwitch1 and VideoSwitch2 may include coaxial digital switches. Therefore, to simplify the test fixture, the eight optical audio signals may be converted to coaxial digital audio signals using OptConv1-OptConv8 and then switched using VideoSwitch1 and VideoSwitch2.

HDMI audio may share most of the same path as the HDMI video. There may be three instruments that require serial communication for control. The SerialControl peripheral may be responsible for communication with the three instruments (VideoSwitch1, VideoSwitch2, and HDMISwitch).

There may be eight IR remote controls, a bar code scanner, and the VideoMUX that all require USB communication. Each IR remote control may be attached or communicate with associated computing device. The bar code scanner may be connected directly to a USB port on the controller. The VideoMux may require two USB ports in order to satisfy power requirements. To accomplish this, a USB hub (USB13) may be connected to a port on the controller. Then the VideoMUX's double USB cable may be connected to two ports on USB13.

In one embodiment, each set-top box may have two data channels, one Ethernet and one HPNA. The HPNA port may be tested via an HPNA bridge and thus converted to Ethernet. Each resulting pair of Ethernet connections may be connected to the associated computing device. In addition, each computing device as well as the controller may be connected to the EthSwitch (16-port Ethernet switch) to allow communication.

Figure 16:
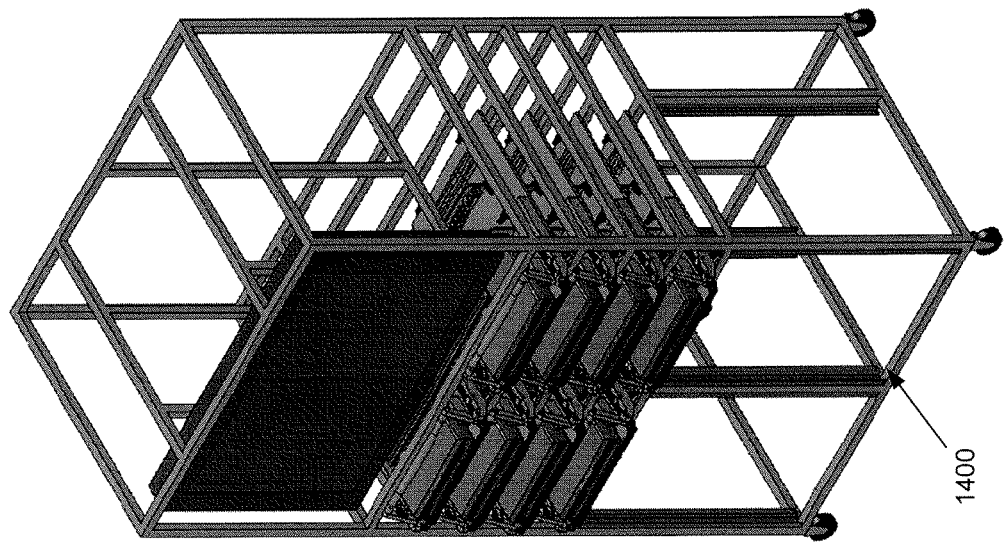
FIG. 16 is a pictorial representation of a perspective view of a the test fixture of FIG. 14 in accordance with an illustrative embodiment.
Figure 15:
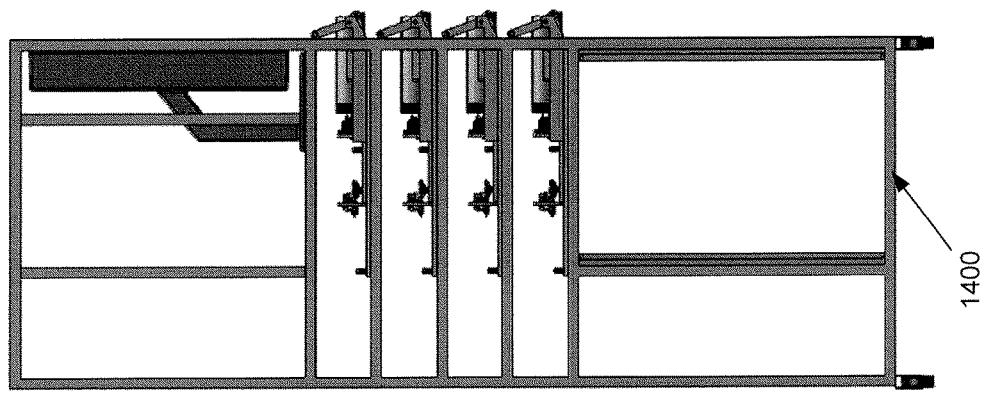
FIG. 15 is a pictorial representation of a side view of the test fixture of FIG. 14 in accordance with an illustrative embodiment.
Figure 14:
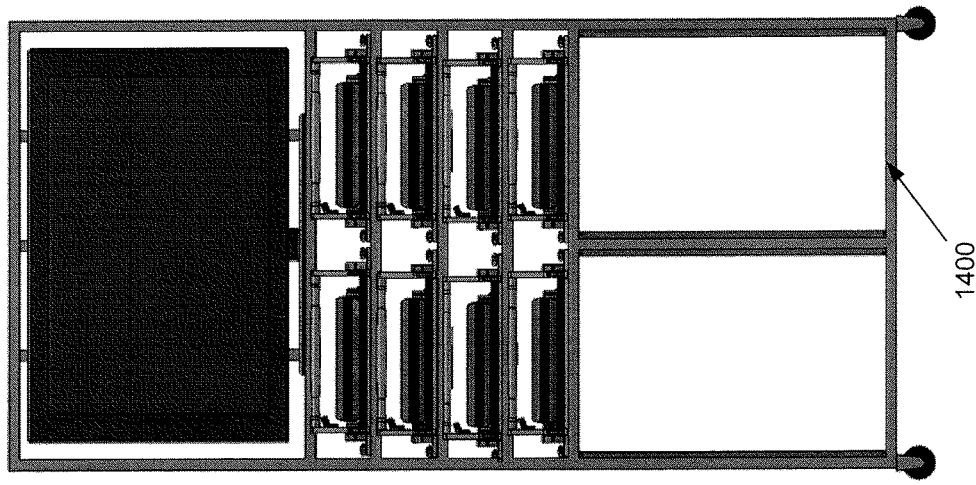
FIG. 14 is a pictorial of a front view of a test fixture of in accordance with an illustrative embodiment.

FIGS. 14-16 show additional embodiments of a test fixture 1400. In particular, FIGS. 14-16 show the framework of test fixture. Sizes and shapes of set-top boxes will continue to change. The test fixture 1400 may be adapted to fit differently sized set-top boxes. In addition, the framework of the test fixture 1400 may allow processing and analysis equipment, components, and modules of any number of shape and sizes to be integrated with, attached to, or connected to racks or columns of the test fixture 1400.

In one embodiment, multiple test fixtures 1400 may be connected or networked together. For example, utilizing a single display, multiple test fixtures may be connected to test any number of set-top boxes from 1-24 or more. In another embodiment, the test fixture 1400 may be connected to a network so that from a single test fixture, computing device, or interface the user may coordinate testing an analysis of multiple test fixtures each connected to multiple set-top boxes. As a result, testing efficiency may be further increased.

The test fixture 1400 may include headend equipment or simulators for testing cable, IPTV, or satellite set-top boxes or other specialized equipment and software for testing gaming devices, DVRs and PVRs. The headend equipment may be utilized to duplicate a cable or satellite signal including formatting, encryption, modulation, and so forth fully testing set-top boxes connected to the test fixture 1400.

Figure 17:
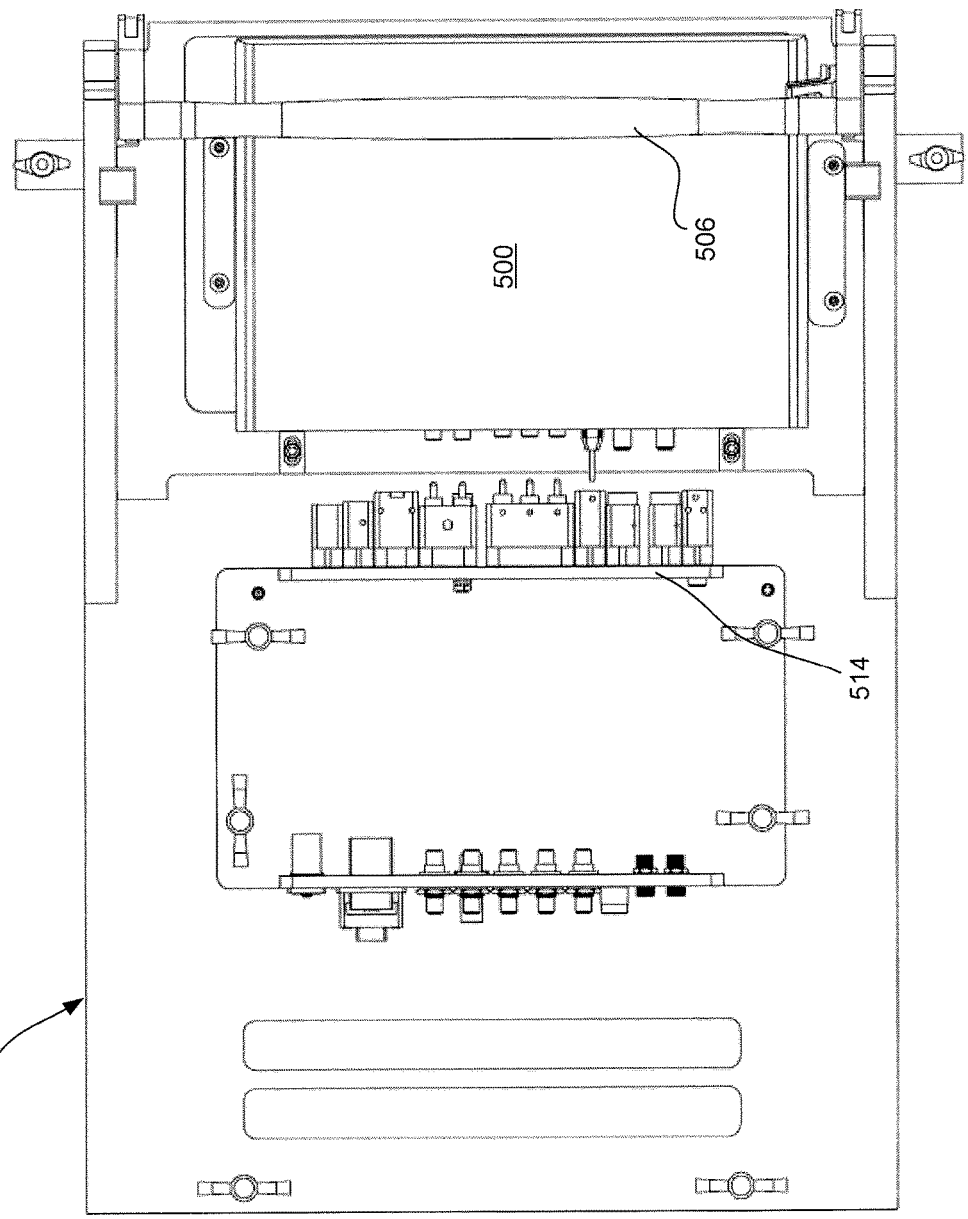
FIG. 17 is a pictorial representation of a top-view of a set-top box in a nested platform in accordance with an illustrative embodiment.

FIG. 17 is another embodiment of the nested platform 502 of FIGS. 5-8 and further illustrates the nested platform 502 (or sled) and the set-top box 500 before being connected. FIG. 17 illustrates the handle 506 in an unlocked or disengaged position (positioned vertically) which may change once the set-top box 500 is connected to the nested platform 402 (horizontal position) by the adapter module 514. Various portions of the nested platform 502 may be biased utilizing springs, elastomers, hydraulics or other components for connecting and disconnecting the set-top box 500 from the nested platform 502 and moving the handle 506.

The illustrative embodiments may be utilized as a testing platform for set-top boxes and other similar electronic devices. The test fixture, systems, and methods described for reducing the time, expense and instrumentation resources required to performing efficient testing, repairs, and CPI removal. In addition, disputes and miscommunication are minimized utilizing the universal fit of the test fixture in conjunction with repeatable configurations for similar set-top boxes.

The previous detailed description is of a small number of embodiments for implementing the invention and is not intended to be limiting in scope. The following claims set forth a number of the embodiments of the invention disclosed with greater particularity.

What is claimed:

1. A test fixture for testing set-top boxes, comprising:
   a controller operable to control parallel testing of a plurality of set-top boxes;
   a plurality of computing devices in communication with the controller operable to perform testing of each of the plurality of set-top boxes in response to commands from the controller;
   a plurality of slidable nested testing platforms located within vertical racks of the test fixture, the plurality of slidable nested testing platforms in communication with the plurality of computing devices and operable to receive each of the plurality of set-top boxes for testing, wherein each of the plurality of slidable nested testing platforms includes an adapter module for electrically interfacing each of the plurality of set-top boxes with the test fixture, each of the plurality of slidable nested testing platforms includes a slidable mount for physical securement of the slidable nested testing platforms within the vertical racks of the test fixture and one or more guides operable to physically secure the plurality of set-top boxes within the slidable nested testing platforms during the testing, wherein each of the slidable nested testing platforms includes a configurable base plate, and wherein the adapter module is configured to provide power to a set-top box being tested on a slidable nested testing platform;
   at least one mechanical robotic arm operable to interact with one or more interfaces of the plurality of set-top boxes during testing of the plurality of the set-top boxes;
   and a user interface in communication with the controller for displaying test results and receiving input from a user.

2. The test fixture according to claim 1, further comprising:
   a scanner for scanning an identifier of one the plurality of set-top boxes, the identifier is associated with the test results for the one of the plurality of set-top boxes.

3. The test fixture according to claim 2, wherein the scanner is a barcode scanner and is further operable to scan the plurality of slidable nested testing platforms for associating each of the plurality of set-top boxes with each of the plurality of slidable nested testing platforms for displaying the test results.

4. The test fixture according to claim 1, wherein the user interface comprises a display, speaker, a keyboard, and mouse.

5. The test fixture according to claim 1, further comprising:
   a test database operable to store test results associated with each of the plurality of set-top boxes and test routines executed by the one or more computing devices to perform the testing.

6. The test fixture according to claim 1, wherein the plurality of computing devices are micro servers.

7. The test fixture according to claim 1, wherein testing for each of the plurality of set-top boxes is automatically initiated in response to one of the plurality of set-top boxes being engaged with one of the plurality of slidable nested testing platforms.

8. The test fixture according to claim 1, wherein the test results are electronically communicated to an external device in response to user preferences or user input.

9. The test fixture according to claim 1, wherein the plurality of set-top boxes have been previously used.

10. The test fixture of claim 1, comprising a plurality of handles each pivotally attached to one of the plurality of slidable nested testing platforms, wherein the plurality of handles are configured to fold back during insertion and removal of the plurality of set-top boxes, and the plurality of handles are configured to lock during the testing of the plurality of set-top boxes.

11. A test fixture for testing a plurality of set-top boxes, comprising:
   a controller operable to control parallel testing of a plurality of set-top boxes;
   a plurality of computing devices in communication with the controller, the plurality of computing devices including testing instrumentations for preforming a plurality of audio and video test on the plurality of set-top boxes, operable to preform testing of each of the plurality of set-top boxes in response to commands from the controller;
   a plurality of slidable nested testing platforms located within vertical racks of the test fixture, the plurality of slidable nested testing platforms in communication with the plurality of computing devices operable to receive each of the plurality of set-top boxes for testing, wherein each of the plurality of slidable nested testing platforms includes a slidable mount for physical securement of the slidable nested testing platforms within the vertical racks of the test fixture and one or more guides operable to physically secure the plurality of set-top boxes within the slidable nested testing platforms during the testing, wherein each of the slidable nested testing platforms includes a configurable base plate, and wherein each of the plurality of nested testing platforms includes an adapter module for electrically interfacing each of the plurality of set-top boxes with the test fixture;
   at least one mechanical robotic arm operable to interact with one or more interfaces of the plurality of set-top boxes during testing of the plurality of the set-top boxes;
   a scanner in communication with the controller for scanning identifiers of one the plurality of set-top boxes and one of the plurality of nested testing platforms, the identifiers are associated with test results for the one of the plurality of set-top boxes;
   a test database in communication with the controller operable to store the test results associated with each of the plurality of set-top boxes, the testing database further stores test routines executed by the plurality of computing devices to perform the plurality of audio and video tests;
   and a user interface in communication with the controller for displaying the test results and receiving input from a user.

12. The test fixture according to claim 11, further comprising:
   a plurality of switches for electrically interfacing each of the plurality of set-top boxes with the testing instrumentations.

13. The test fixture according to claim 11, wherein the test results are color coordinated for analysis by the user.

14. The test fixture according to claim 11, wherein the user interface comprises a display, and a keyboard and mouse, and wherein the test fixture prompts the user to provide a user input to perform the testing of the plurality of set-top boxes.

15. The test fixture according to claim 11, wherein the test results are electronically communicated to an external device in response to user preferences or user input.

16. The test fixture according to claim 11, wherein the identifiers include at least a serial number of the plurality of set-top boxes.

17. The test fixture according to claim 11, wherein the scanner is a barcode scanner and is further operable to scan the plurality of slidable nested testing platforms for associating each of the plurality of set-top boxes with each of the plurality of slidable nested testing platforms for displaying the test results.

18. The test fixture according to claim 11, wherein the test fixture is expandable to receive additional slidable nested testing platforms for testing additional set-top boxes.

19. The test fixture according to claim 11, wherein the adapter module is interchangeable for testing a particular mode of the plurality of set-top boxes.

* * * * *